US006228933B1

(12) United States Patent
Hiles

(10) Patent No.: US 6,228,933 B1
(45) Date of Patent: May 8, 2001

(54) UNIQUE ENERGY DISSIPATING POLYURETHANE ELASTOMERIC COMPOSITION SUPPORTING A PHYSICALLY SOFT MAGNETIC SYSTEM

(75) Inventor: Maurice Hiles, Akron, OH (US)

(73) Assignee: Remington Products Company, Wadsworth, OH (US)

( * ) Notice: Subject to any disclaimer, the term of this patent is extended or adjusted under 35 U.S.C. 154(b) by 0 days.

(21) Appl. No.: 09/327,567

(22) Filed: Jun. 8, 1999

(51) Int. Cl.[7] ............................... C08J 3/00; C08K 3/18; C08K 3/22; C08K 3/08; C08L 75/00
(52) U.S. Cl. .................... 524/590; 524/430; 524/431; 524/435; 524/436; 524/437; 524/439; 524/440; 524/441; 524/589
(58) Field of Search ....................... 524/589, 590, 524/439, 441, 440, 430, 435, 436, 437, 431

(56) References Cited

U.S. PATENT DOCUMENTS

| 4,346,205 | 8/1982 | Hiles ....................... 528/53 |
| 4,476,256 | 10/1984 | Hamermesh .................. 523/152 |
| 4,476,258 | * 10/1984 | Hiles ....................... 523/212 |
| 4,786,703 | 11/1988 | Starner et al. ................ 528/63 |
| 4,826,944 | 5/1989 | Hoefer et al. ................ 528/49 |
| 4,837,245 | 6/1989 | Streu et al. .................. 521/117 |
| 4,877,829 | 10/1989 | Vu et al. ..................... 524/729 |
| 5,001,167 | 3/1991 | Wiltz, Jr. et al. ............. 521/174 |
| 5,070,114 | 12/1991 | Watts et al. .................. 521/159 |
| 5,070,138 | 12/1991 | Bulluck ....................... 524/871 |
| 5,164,422 | 11/1992 | Londrigan et al. .............. 521/159 |
| 5,227,451 | 7/1993 | Tsuge et al. .................. 528/59 |
| 5,496,436 | 3/1996 | Bernstein et al. .............. 156/628.1 |
| 5,508,372 | 4/1996 | Brahm et al. .................. 528/80 |
| 5,872,193 | 2/1999 | Narayan et al. ................ 525/460 |

* cited by examiner

Primary Examiner—Patrick D. Niland
(74) Attorney, Agent, or Firm—Renner, Kenner, Greive, Bobak, Taylor & Weber

(57) ABSTRACT

Energy dissipating soft polyurethane elastomeric compositions containing any compound that may be magnetically or electro-magnetically aligned to define useful permanent magnetic fields and which may also contain, where desirable, a light-weight filler, are formed by the reaction of an urethane forming polyol containing at least four urethane forming reactive sites and capable of forming stable complexes through free-radicle urethane forming reactive sites, an elasticizing polyol selected from the group comprising diols and triols and a diisocyanate in less than stoiciometric equivalents and resulting in compositions having densities from about 1.2 to 3.8 grams per cc, a compression set of less than 5%, a recovery time of between 10 to about 200 milliseconds and surface hardness of less than about 70 when measured on the Shore 00 scale.

21 Claims, 4 Drawing Sheets

CONVERSIONS BETWEEN SHORE SCALES A, B, C, D, O & OO 0 and 00 Sponge rubber, printers' rollers, etc.
A  All elastic rubbers, the softer plastics
B  Harder plastics, typewriter rolls, etc.
C  (non-injurious test) for hard plastics, golf balls.
D  (Sharp point) up to hardness approaching brittleness Very approximate conversions of these scales are give below.
It will be noted that scale B is parallel to Scale A whereas all the others meet the zero and 100 of scale A.

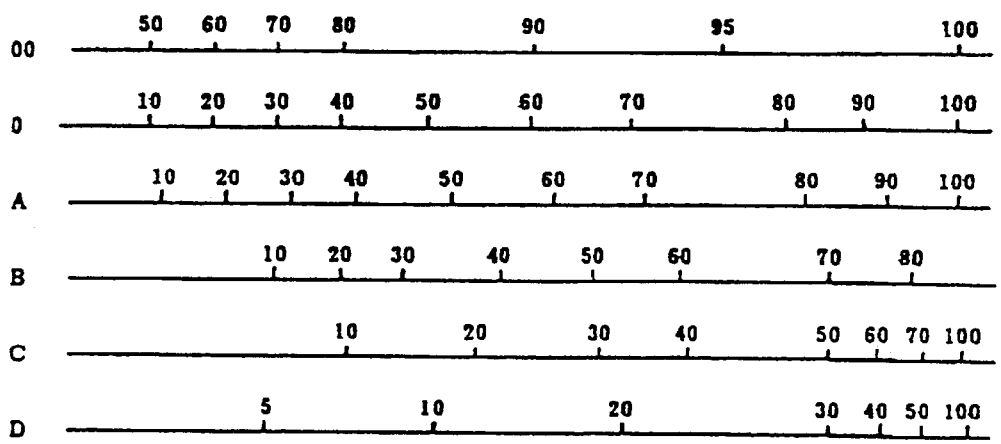

FIG. 1

UNIQUE ENERGY DISSIPATING POLYURETHANE ELASTOMERIC COMPOSITION SUPPORTING A PHYSICALLY SOFT MAGNETIC SYSTEM

TECHNICAL FIELD

This invention relates to physically soft magnets, that is with a surface hardness of less than about 70 on the Shore 00 scale, that are capable of visco-elastic deformation without distorting the associated magnetic fields and methods for manufacture thereof. Drawing #1 shows a simplified comparison of the several Shore scales of hardness.

BACKGROUND TO THE INVENTION

It is well known that pieces of certain pure metals, namely iron, cobalt and nickel can be treated in such a way that their magnetic moments or domains become aligned and said pieces then behave as magnets, that is they acquire a magnetic field within which magnetic materials may be influenced as to their energy content and potential. The strength of the field increases according to the percentage of the domains present and those aligned. The field can be further increased by the addition of other metals or their oxides to form magnetic alloys, for example barium, boron, copper, neodymium, promethium and samarium. Tri-alloys can also be formed further increasing the field strength, for example, neodymium-iron-boron. Another group of suitable magnetic materials is called ferrites. These consist of the oxides of iron to which small quantities of transition metal oxides; for example, cobalt or nickel have been added. These are known as spinel ferrites and have the general formula $M(OFe_2O_3)$ where M is a divalent transition ion. Another form of ferrite is iron oxide to which the oxides of the reactive metals strontium or barium have been alloyed. Ferrites are particularly useful because they are easily reduced to a powder and can be reformed to suitable shapes by compaction or as a component of a plastic or ceramic compound. Such reconstituted ferrite particles when part of a ceramic compound produce a magnet with a surface hardness as high as 70 on the Shore D scale. When incorporated in a plastic the hardness is reduced generally to around 90 on the Shore A scale and as a rubber component the reading is about 60 on the Shore A scale. Plastic and rubber based magnets can be made flexible if cast in very thin section in which case, however, the field strength is usually impracticably low. To overcome this the magnetic sheet is often rolled to form a round or square section tube. The result is almost a total loss of cross-sectional flexibility but retaining such longitudinal flexibility as to make them useful for gaskets including domestic appliances such as refrigerators where curvature is gentle and sharp bends are catered for by miter jointing. Thin flat magnets of low field strength find a use as markers on a magnetic indicator board, in children's toys and as decorative refrigerator magnets which sometimes double as note-holders. It has been found that magnets of higher strength that is of thicker cross section are capable of attracting the hemoglobin content of erythrocytes present in blood plasma. Such magnets have been strategically placed in medical devices to attract erythrocytes to various parts of the body to increase the oxygen supply to that point. These points are often nerve endings and are sometimes described in Oriental medicine as pressure or acupuncture points. Magnets are embedded in or attached to rubber, plastic, cloth or other materials to hold them in place. It will be seen that these magnets are necessarily small in diameter, comparatively large in cross section and of hardness at least measurable as 50 on the Shore A scale. Such magnets must be cushioned if they are placed near to soft tissue. Any barrier will reduce the field strength of a magnetic source. The magnets are always discernable and often uncomfortable especially when used in footwear and more especially on the upper regions of footwear insoles where loads are heavy and vertically applied. Furthermore, it will be seen that these discreet magnet areas of high compression combined with the magnetic attraction directed towards the hemoglobin can slow the blood to such an extent as to encourage vascular restriction or clotting. When the hemoglobin becomes methemoglobin, that is the oxide has degenerated from ferrous (($\ddagger$)) to ferric (($\ddagger$)) a localized area of cyanosis may be caused due to lack of oxygen. Clotting in this region could prove fatal. Such quasi (or alternative) medical devices include shoe insoles, elbow, knee, spinal and neck pads.

SUMMARY OF THE INVENTION

It will be seen that there is a need for a magnet that, for quasi medical purposes, can be worn next to soft tissue without interfering with the comfort or well being of the wearer and for other purposes such as washers, isolators, energy dissipating pads and gaskets, for example those used in manhole cover systems, capable of deflecting easily but with a limited degree of permanent compression and a pre-determined recovery rate. For quasi-medical purposes this recovery rate should be similar to that of the soft tissue with which it is going to closely function. For example, the recovery rate of the calcaneal fat pad is between 10 and 100 milliseconds and on very rare occasions this delay may be extended to 200 milliseconds.

The ideal compound will be based on a flexible plastic or rubber containing suitable quantities of a magnetic powder or finely divided crystal which may be a ferrite or other magnetic mixtures as previously described. Such a compound could be cast, injection molded, rotationally molded, transfer molded, compression molded or a combination of these practices. The preferred method of manufacture is by thermo-setting casting.

It has been discovered that a filled polyurethane elastomer composition having a density of from about 1 to 3.5 gms. per cc., a compression set of less than about 5% and a recovery time from about 10 to 200 milliseconds having particular utility as an energy dissipating medium and having the appropriate magnetic field strength when cast can be prepared. Such polyurethane elastomer compositions contain a ferro-magnetic or similar compound in quantities to command a suitable magnetic field strength and, where necessary when weight is critical, a light weight filler material may be combined, for example, hollow glass or ceramic spheres can be coated with a metal such as nickel or iron (steel). Such a compound will contain at least four urethane-forming reactive sites, which are capable of forming stable complexes.

The invention is directed to a process for forming a polyurethane elastomer composition wherein a compound is mixed having at least four urethane-forming reactive sites and capable of forming stable complexes through free radicle reactive sites with an elasticizing diol or triol, a plasticizer if preferred, a light-weight reinforcing filler material if necessary and a magnetic component capable of supporting a suitable magnetic field and adding a diisocyanate in less than stoichiometric amounts allowing the formation of urethane linkages involving less then about 85% of the urethane-forming reactive sites of the quadra-functional forming a coordinately bonded or chelated complex to provide a stable solid having a density between 1.2 and 3.8 grams per cc. and a compression set of less than about 5% and a recovery time of about 10 to about 200 milliseconds. A diisocyanate, such as 4'4' dimethyl diisocyanate is added to the polyol mixture to form the cross linking sites at a ratio of between (parts by weight) of polyol to 1 pbw of diisocyanate and 15 pbw of polyol to 1 pbw of diisocyanate. The magnetic powder is added at a level of between 5% and 100% of the polymer prior to reaction. In cases where weight is a critical factor some or most of the magnetic powder can be replaced by a light weight filler such as glass or ceramic micro-balloons (coated or uncoated), fly ash or fumed silica. Thus the density of the cured compound can be between 0.4 and 2.5 grams per cc.

During and after the reaction, the unreacted urethane forming reactive sites are stabilized by the formation of complexes, preferably by chelation with ionic species introduced as part of the complete formulation. Preferably at least 15% of the reactive groups capable of forming urethane linkages remain unreacted and stabilized in this manner.

DESCRIPTION OF THE PREFERRED EMBODIMENTS

Reference is now made in detail to the presently preferred embodiments of the invention. As used throughout this specification references to ratios of components and percentages are by weight unless otherwise stated. Also as used herein, the term "compression set" refers to the percentage of permanent deformation caused by application of a practical compressive load in accordance with ASTM standard test 395, method B.

The term "recovery time" as used herein refers to the time required for the polymer complex to return to its passive thickness (accounting for permanent deformation associated with compression set) following application of a practical load. Since the materials formed in accordance with this invention have unusually short recovery times, standard ASTM testing specifications are not useable for this measurement. The measurement is conducted photographically by applying a practical load, for example, the average weight of a non-obese man (180 lbs.) to a sample of the polymer material 3/16 of an inch thick (as in an average shoe insole) for the length of an average slow step (about 400 milliseconds). The compressive load is then removed and the material allowed to recover to its passive thickness, that is less than its original thickness due to phenomena associated with the appropriate compression set. The whole procedure is photographed at 500 frames per second and counting the number of frames exposed prior to the return of the polymer material to its passive thickness allows the recovery time to be calculated.

The compound contains at least four reactive sites which may be either hydroxyl or carboxyl groups. Hydroxyl groups are preferred and a particularly preferred compound of this group is a tetrol. Tetrols useable in accordance with the present invention preferably have molecular weights ranging from about 170 to about 450. Quadra-functional reactants formed from derivatives of ethylene diamine are particularly preferred. Such particularly preferred compounds are of the following general formula:

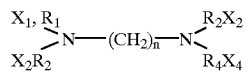

Wherein "n" is an integer between 1 and 4; $X_1$, $X_2$, $X_3$, and $X_4$, which may be the same or different are hydroxyl or carboxyl groups; and $R_1$, $R_2$, $R_3$ and $R_4$ which may be the same or different are alkyl groups with from 1 to 3 carbon atoms. Such compounds include those having molecular weights between 170 and 450, those having molecular weights between 200 and 350 are preferred. The elasticizing component of compositions formed in accordance with the present invention may be either a diol or triol in structure, diols being preferred. Diols useful in accordance with the claimed invention may be polyalkylene glycols with molecular weights ranging between 1000 to 3000. A particularly preferred diol is a polyethylene ether glycol of molecular weight being 1500 and 2500.

The diisocyanate used in compositions of the present invention may be any of the diisocyanates conventionally used in the formation of polyurethane materials. Aromatic diisocyanates are preferred and 4'4' methyl diisocyanate is particularly preferred. The diisocyanate is reacted in less than stoiciometric equivalents such that at least 15% of the urethane forming reactive sites in the other components remain unreacted.

Suitable urethane forming catalysts include organic-metal salts such as dibutyl tin dilaurate, cobalt octoate or phenyl mercury carboxylate and organic compounds such as tertiary amines.

The reinforcing lightweight filler materials employed in the composition of the present invention perform the dual function of reducing the overall density and improving the mechanical strength of the composite. Particularly preferred lightweight filler materials include hollow glass spheres, silicon dioxide spheres such as those formed as fly ash, phenolic microballoons and fumed silica powder. Such reinforcing materials have a particle size range of between 5 and 250 microns and a mean particle size of between 70 and 100 microns. These lightweight materials have an effective density, in terms of liquid displacement, of between 10 and 25 grams per $cm_3$. As previously state these particles may be coated with a magnetic compound. The particles may be further coated with an adhesion promoting composition that improves the bond between the filler and its host polymer.

The magnetic content will vary in type, bulk density and manner of polarization according to the intended end use. For example a strontium-iron alloy will support a low (or weak) or medium magnetic field according to its purity. A stronger field will result if barium is substituted for the strontium component. The field will increase in strength in direct proportion to the bulk density that is the proportion of powder to polymer. The manner of polarization can vary from single pole, that is in simplest form North on the obverse and South on the reverse, to multiple polar pairs opposing each other. The pairs can be linear or concentric or any other suitable pattern. A single pole, or dipole will give continuous depth to a field, that is it will tend to penetrate intermediates between the magnetic source and target whereas a multi pole of similar unit strength lacks the depth of penetration but when the distance between source and target is minimized the attractive energy is greater. Such fields are depicted on drawing number 2 (FIGS. 2, 3 & 4).

It will be seen, therefore, that when used in a bio-magnetic system that is part of a shoe insole a single pole or dipole magnet is preferred. Although, depending on the design such poles can be selective. The field must penetrate any moisture barrier insole cover, probably a sock and most certainly the soft, connective tissue that protects the blood vessels through which the target, namely the hematin content of an erythrocyte, flows.

On the other hand a gasket for sealing an iron inspection cover has no barrier to overcome but will benefit from maximum mating energy. For this application the only limit to the field strength is the bulk density of the magnetic content of the polymer host.

With bio-magnets and, in particular, those that are intended to be located near to human or animal tissue the determination of the optimum field strength requires most careful consideration. The bio-objective of the magnet is to influence the oxygen carrying capability of the hemoglobin in blood cells. This can only be achieved in one way and that is to speed the blood flow. Erythrocytes are large when synthesized in the bone marrow and decrease in size as they mature until they become necrotic usually after a period of 21 days. Their ability to transport oxygen is dependent on the volume and quality of the hematin factor and nothing else. No magnetic field can affect this perimeter. If the field is of the correct strength it will attract the ferrous (($\ddagger$)) content of the blood cell and thus increase its flow rate and in so doing it will dilate the arteries. However, when a cell comes to the focal point of the field it cannot be allowed to falter, slow or stop but must be forced passed that point by oncoming plasma providing uniformity of flow.

It will be seen, therefore, that if the field is higher than the level described above, it will tend to attract and even conglomerate cells to the focal point thus presenting the danger of a restriction or clot. It should also be considered that in conditions of oxygen depletion cyanosis occurs in which case the ferrous (+) iron is reduced to the ferric (($\ddagger$)) form. Any reduction in flow of such plasma would cause severe medical conditions and even death.

In this latter use the strength of the magnet and, therefore its field must be very carefully calculated. A wide range of field strengths has been proposed as suitable, for example, from 40 to 4,000 gauss. However, confusion exists in many cases as to whether the measurement applies to the face of the magnet or at the target. In the use of bio-magnets the latter figure will be much diminished, as the energy will probably have traveled through a dielectric (air), intermediate covering and clothing, dermal and epidermal connective tissue.

It should be further understood that when a magnetic mixture in the form of a powder is compounded and cross-linked integrally within a polymerization process an external force must be applied to the polymerized product to achieve some form of alignment and in so doing create a useful magnetic field. A method of achieving this is shown in drawing #3(FIG. 6).

It has been previously stated that with any particular magnetic compound the field strength it can subtend is dependent on the resultant bulk-density of the magnetic content. Pre-aligning the magnetic particles during the process of polymerization can thus increase the field strength. In this case the alignment will follow the lines of force which, in turn, offers an effective means of controlling the magnetic pattern. A method of achieving this is described in FIG. 6. Such a polymerization condition will not only increase the effectiveness of the alignment process; it will also compact the magnetic particles so that they are separated by only the minimum polymer film ensuring maximum density.

Polyol-isocyanate systems of sufficiently low viscosity when unreacted and sufficiently flexible when reacted to be useful in this reaction have been described by Hiles (U.S. Pat. No. 4,346,205). Hiles (U.S. Pat. No. 4,476,258) and Narayan et al (U.S. Pat. No. 5,872,193).

DESCRIPTIONS OF THE DRAWINGS

FIG. 1 is a comparative reference chart of the several Shore scales of surface hardness.

FIG. 2 is a diagram plan and elevation of a mechanical rig suitable for inciting single pole polarization. 7 is the steel reflecting harness. 8 indicates the charging magnets. 9 is a South seeking pole and 10 is a North seeking pole. 11 is a prescribed air space. When the magnets are 2"×2"×1" spaced 2" apart and constructed of a magnetic material known as NE27 (neodymium-iron-boron) a field of about 6000 gauss is generated between the opposing poles.

Figure 6:
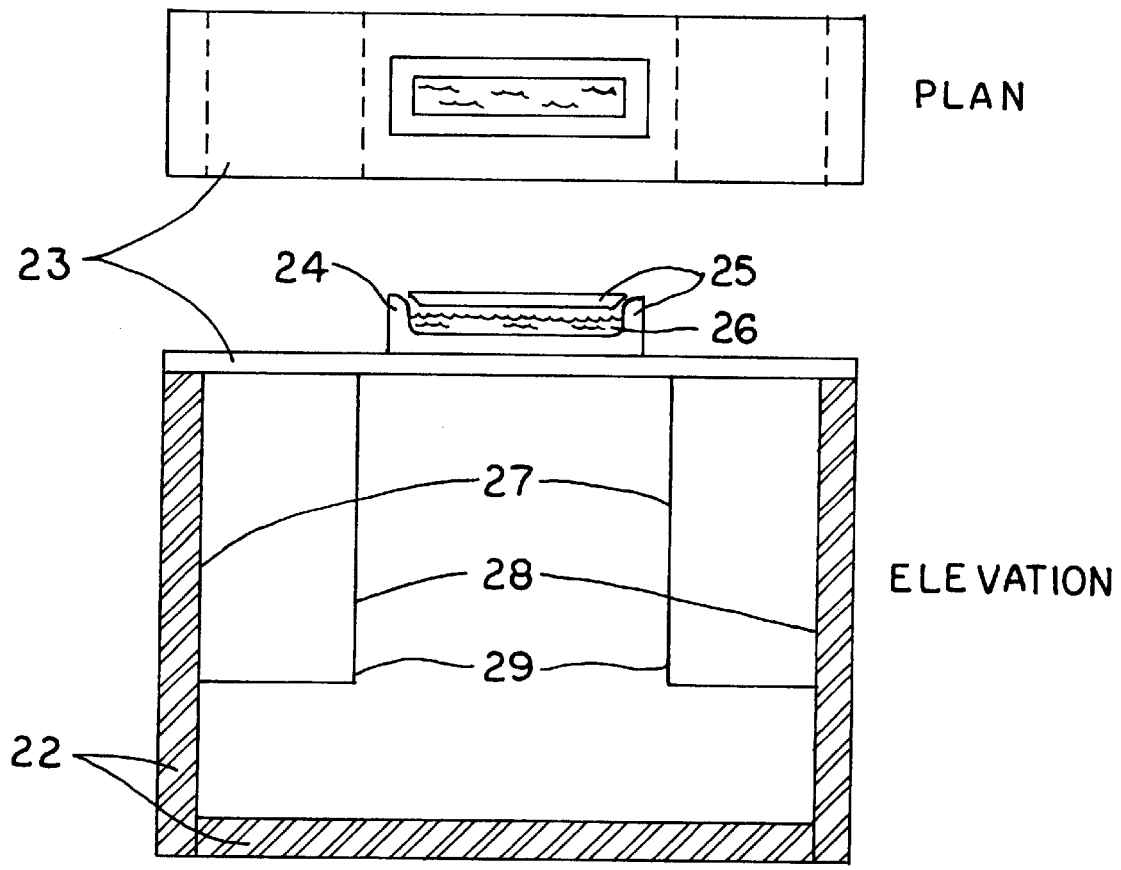

FIG. 6 shows a method for aligning magnetic particles during the polymerization process. 22 indicates the steel reflecting harness and 23 the keeper plate that supports the mold. 24 represents non-magnetic mold and 25 the non-magnetic mold cap which can be applied to control the surges or waves that occur over each force line. The appropriate shape of the part is thus maintained. 26 indicates the polymerizing compound that will become the physically soft magnet. 27 indicates the North seeking poles and 28 the South seeking poles of the permanent magnet (or electromagnet if desired) generating the afore-said line of force. 29 represents the necessary air gap.

NOTE

Although not within the scope of this invention it should, nevertheless, be taken into consideration that substances other than metals can be magnetized, that is, caused to levitate above (negative-gravity) a magnetic field. These substances can even be living organisms. For example: small frogs and beetles have been caused to levitate above a magnet having a field strength of 20 K. gauss focused within a 2 inch window. The limiting factor is the percentage of hematin in the plasma, if plasma is present, and its deviation in the magnetic field.

EXAMPLES

It will be obvious to those skilled in the art that a polyol-isocyanate reaction can also be presented as a resin-prepolymer reaction when it is considered desirable to close the ratio of the two components. It is in the latter form that the following samples were prepared.

SERIES A

Figure 2:
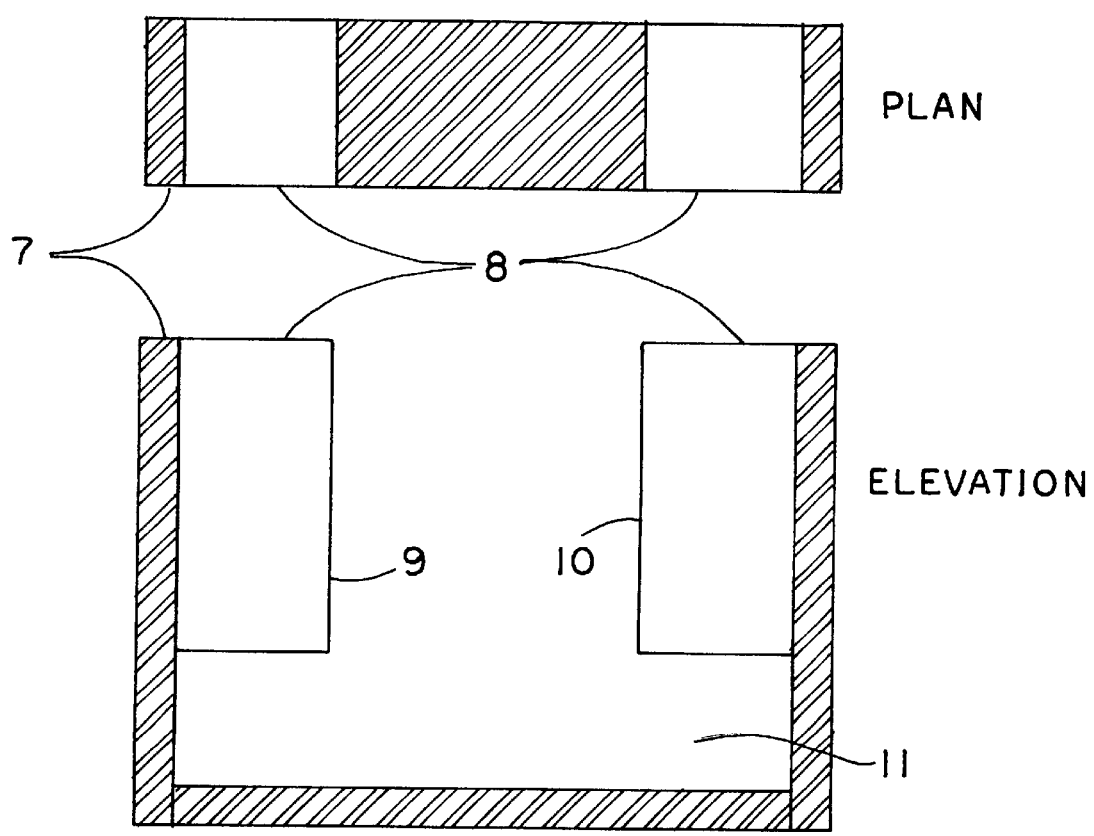
Figure 3:
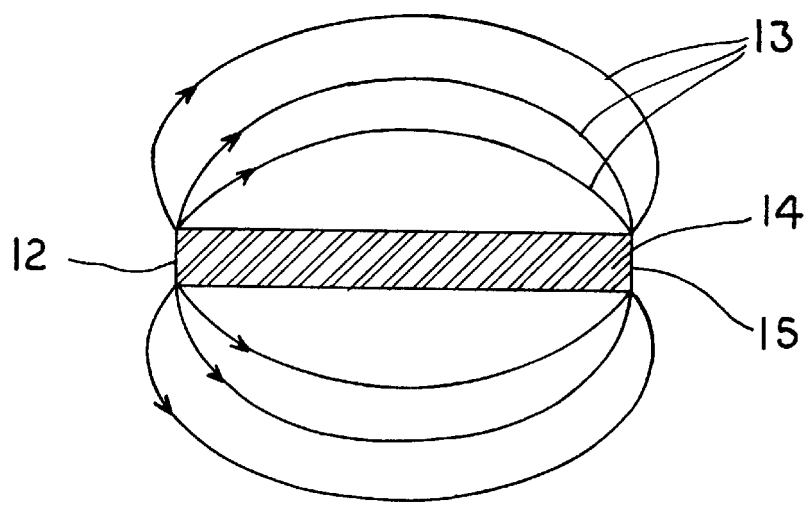
FIG. 3 is a polar diagram of a single pole magnet. 12 is a South seeking pole. 13 is the lines of force and 14 is the magnet. 15 is the North seeking pole.
Figure 4:
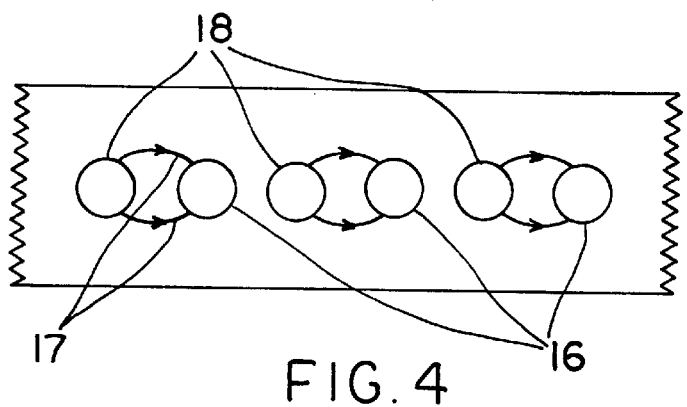
FIG. 4 is a polar diagram of a di-pole or multi-pole polarization. 16 shows the North seeking poles. 17 the short lines of force and 18 the South seeking poles.
Figure 5:
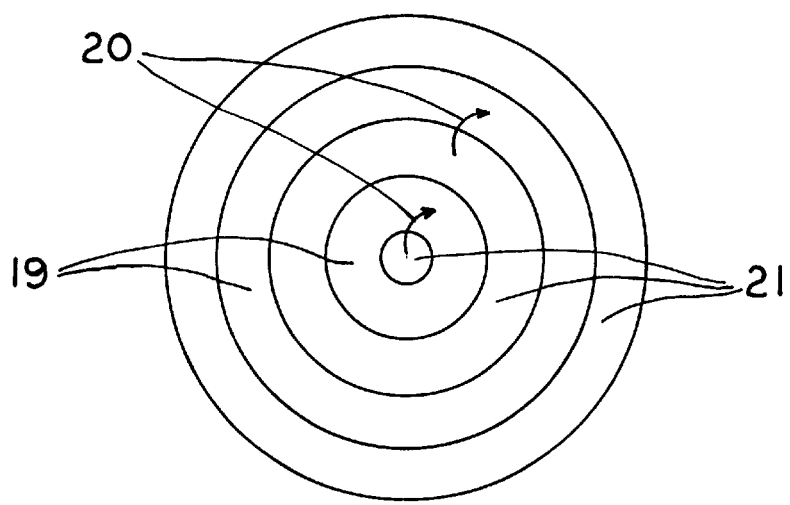
FIG. 5 shows a concentric pattern of polarization. 19 indicates the North seeking poles. 20 the short lines of force and 21 the South seeking poles.

In each case the metallic filler was first blended into the resin in a beaker at room temperature (68° F.) and then the appropriate quantity of pre-polymer (as indicated in table 1) was added and stirred for one minute and then poured into an open mold at a temperature of 160° F. The samples were demolded after a few minutes and subjected to a magnetizing force generated as in FIG. 2. A field strength of 10 gauss was recorded.

SERIES B

The procedure in Series A was duplicated except that a cover was placed to close the mold completely which was then placed within the influence of a magnetizing field as in FIG. 6. When demolded a field strength of 200 gauss was recorded.

SERIES C

The previously aligned samples prepared as in Series B were subjected to a magnetic field generated by a pulse magnetizer with an output of 50 K oesteds. The field strength of the sample was increased to 1000 gauss.

TABLE 1

| (parts by weight) | | | | | | | |
|---|---|---|---|---|---|---|---|
| Polyol | 100 | 100 | 100 | 100 | 100 | 100 | 100 |
| Isocyanate | 12 | 11 | 10 | 10 | 10 | 9 | 08.5 |
| Prepolymer | 28.5 | 25.0 | 22.5 | 22.5 | 22.5 | 20.0 | 18.0 |
| Resin | 100 | 100 | 100 | 100 | 100 | 100 | 100 |
| Magnetic powder | | | | 100 | 100 | | |
| Hardness Shore 00 | 60 | 55 | 45 | $55_1$ | $50_2$ | 30 | 20 |

$_1$Series A
$_2$Series B

What I claim is:

1. A polyurethane elastomer composition that is the reaction product of:
   (a) a urethane forming component comprising a compound containing at least four urethane forming reactive sites and capable of forming stable complexes with component (b) through unreacted urethane forming reactive sites, an elasticizing polyol selected from the group consisting of diols and triols, and
   (b) a diisocyanate reacted in less than stoiciometric amounts, wherein the polyurethane elastomer composition contains a finely divided metallic substance in which the magnetic moments can be aligned when subjected to a magnetic field either pre, during or post polymerizing of the polyurethane elastomer composition.

2. A polyurethane elastomer composition that is the reaction product of:
   a) a urethane forming component comprising a compound containing at least four urethane forming reactive sites and capable of forming stable complexes with component (b) through unreacted urethane forming reactive sites, a diol, and
   (b) a diisocyanate reacted in less than stoiciometric amounts, wherein the polyurethane elastomer composition has a density of, from about 1.2 to about 3.5 gms/cc, a compression set of less than 5%, a recovery time of from about 10 to about 200 milliseconds, and a hardness of less than 70 when measured on the Shore 00 scale, and contains a finely divided metallic substance in which the magnetic moments can be aligned when subjected to a magnetic field either pre, during or post polymerization.

3. A polyurethane elastomer composition according to claim 1 wherein a portion of said elasticizing polyol is replaced by a plasticizer.

4. A polyurethane elastomer composition according to claim 3 wherein the plasticizer is selected from the group consisting of alkyl adipates, alkyl phthalates, alkyl azelates, alkyl benzoates, alkyl citrates, similar soy and linseed oils and suitable mixtures thereof.

5. A polyurethane elastomer composition according to claim 4 wherein the plasticizer is dialkyl phthalate.

6. A polyurethane elastomer composition according to claim 1, having a density of from about 1.2 to about 3.5 gms/cc, a compression set of less than 5%, a recovery time of from about 10 to about 200 milliseconds, and a hardness of less than 70 when measured on the Shore 00 scale.

7. A polyurethane elastomer composition according to claim 1 wherein the elasticizing polyol is a polyoxyalkylene polyether.

8. A polyurethane elastomer composition according to claim 7 wherein the polyoxyalkylene polyether has a molecular weight of from about 1000 to about 3000.

9. A polyurethane elastomer composition according to claim 1 wherein said reaction is catalyzed by an added catalyst.

10. A polyurethane elastomer composition according to claim 1 wherein said unreacted urethane forming reactive sites are stabilized by chelation.

11. A polyurethane elastomer composition according to claim 10 wherein said chelation is effected by ionic species.

12. A polyurethane elastomer composition according to claim 1 wherein said compound containing at least four reactive sites is a tetrol.

13. A polyurethane elastomer composition according to claim 12 wherein the urethane forming reactive sites are selected from the group consisting of hydroxyl groups and carboxyl groups.

14. A polyurethane elastomer composition according to claim 13 wherein the urethane forming reactive sites are effected by hydroxyl radicles.

15. A polyurethane elastomer composition according to claim 12 wherein said tetrol is of the following formula.

$$\begin{matrix} X_1, R_1 \\ \diagup N-(CH_2)_n-N \diagdown \\ X_2R_2 \end{matrix} \begin{matrix} R_2X_2 \\ \\ R_4X_4 \end{matrix}$$

wherein n is an integer from 1–4, $X_1$, $X_2$, $X_3$, and $X_4$ are hydroxyl groups and $R_1$, $R_2$, $R_3$ and $R_4$, which may be the same or different, are alkyl groups with from 1 to 3 carbon atoms.

16. A polyurethane elastomer according to claim 15 wherein said tetrol has a molecular weight of between about 150 and about 350.

17. A polyurethane elastomer according to claim 1 wherein the diisocyanate is 4,4' diphenylmethane diiosocyanate.

18. A polyurethane elastomer composition according to claim 1, wherein the polyurethane elastomeric composition further contains a lightweight filler.

19. A polyurethane elastomer composition according to claim 18 wherein the lightweight filler is selected from the group consisting of glass micro spheres, silicon dioxide micro spheres, ceramic micro spheres, and mixtures of the foregoing.

20. A polyurethane elastomer composition according to claim 19 wherein the lightweight filler contains micro spheres coated with metal and/or an adhesion promoter.

21. A polyurethane elastomer composition that is the reaction product of:
   (a) a urethane forming component comprising a compound containing at least four urethane forming reactive sites and capable of forming stable complexes with component (b) through unreacted urethane forming reactive sites, an elasticizing polyol selected from the group consisting of diols and triols, and (b) a diisocyanate reacted in less than stoiciometric amounts, wherein the polyurethane elastomer composition has a density of from about 1.2 to about 3.5 gms/cc, a compression set of less than 5%, a recovery time of from about 10 to about 200 milliseconds, and a hardness of less than 70 when measured on the Shore 00 scale, and contains a finely divided metallic substance selected from the group consisting of barium, boron, cobalt, copper, iron, neodymium, nickel, promethium, samarium, and strontium, and mixtures of the foregoing.

* * * * *